(No Model.) 3 Sheets—Sheet 1.
W. A. LAWRENCE.
FURROWER, MARKER, AND FERTILIZER DISTRIBUTER COMBINED.
No. 313,504. Patented Mar. 10, 1885.

WITNESSES

INVENTOR
W. A. Lawrence
By C. A. Snow & Co.
Attorneys (No Model.) 3 Sheets—Sheet 2.

W. A. LAWRENCE.
FURROWER, MARKER, AND FERTILIZER DISTRIBUTER COMBINED.

No. 313,504. Patented Mar. 10, 1885.

WITNESSES
C. W. Dashiell.
E. G. Siggers.

INVENTOR
W. A. Lawrence
By C. A. Snow & Co.
Attorneys.

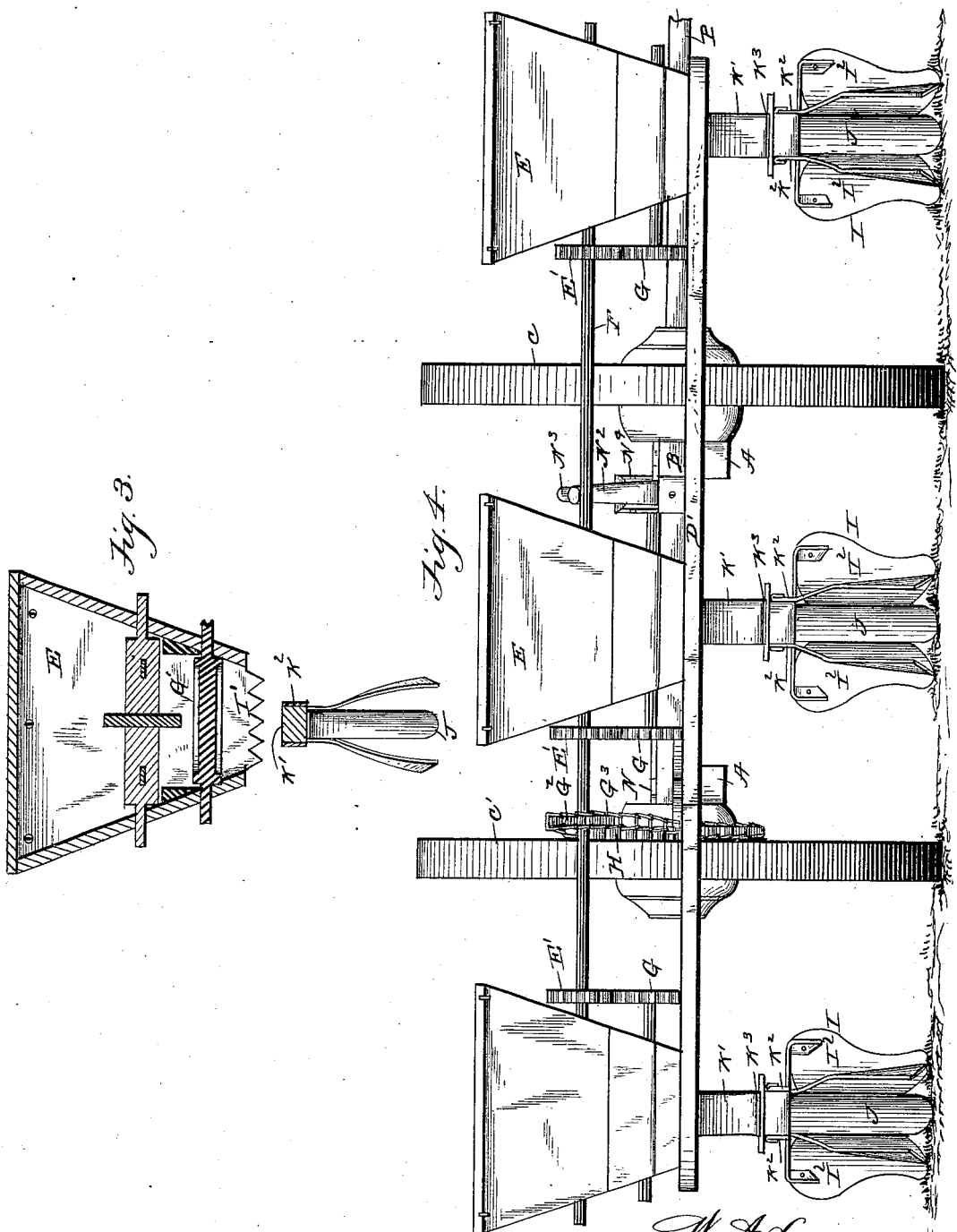

UNITED STATES PATENT OFFICE.

WILLIAM AUGUSTUS LAWRENCE, OF FLUSHING, NEW YORK.

FURROWER, MARKER, AND FERTILIZER-DISTRIBUTER COMBINED.

SPECIFICATION forming part of Letters Patent No. 313,504, dated March 10, 1885.

Application filed September 12, 1884. (No model.)

*To all whom it may concern:*

Be it known that I, WILLIAM A. LAWRENCE, a citizen of the United States, residing at Flushing, in the county of Queens and State of New York, have invented a new and useful Improvement in a Furrower, Marker, and Fertilizer-Distributer, of which the following is a specification, reference being had to the accompanying drawings.

My invention relates to furrowers, markers, and fertilizer-distributers combined; and it consists in the novel construction and arrangement of parts, as will be hereinafter fully described, and particularly pointed out in the claims.

Figure 1:
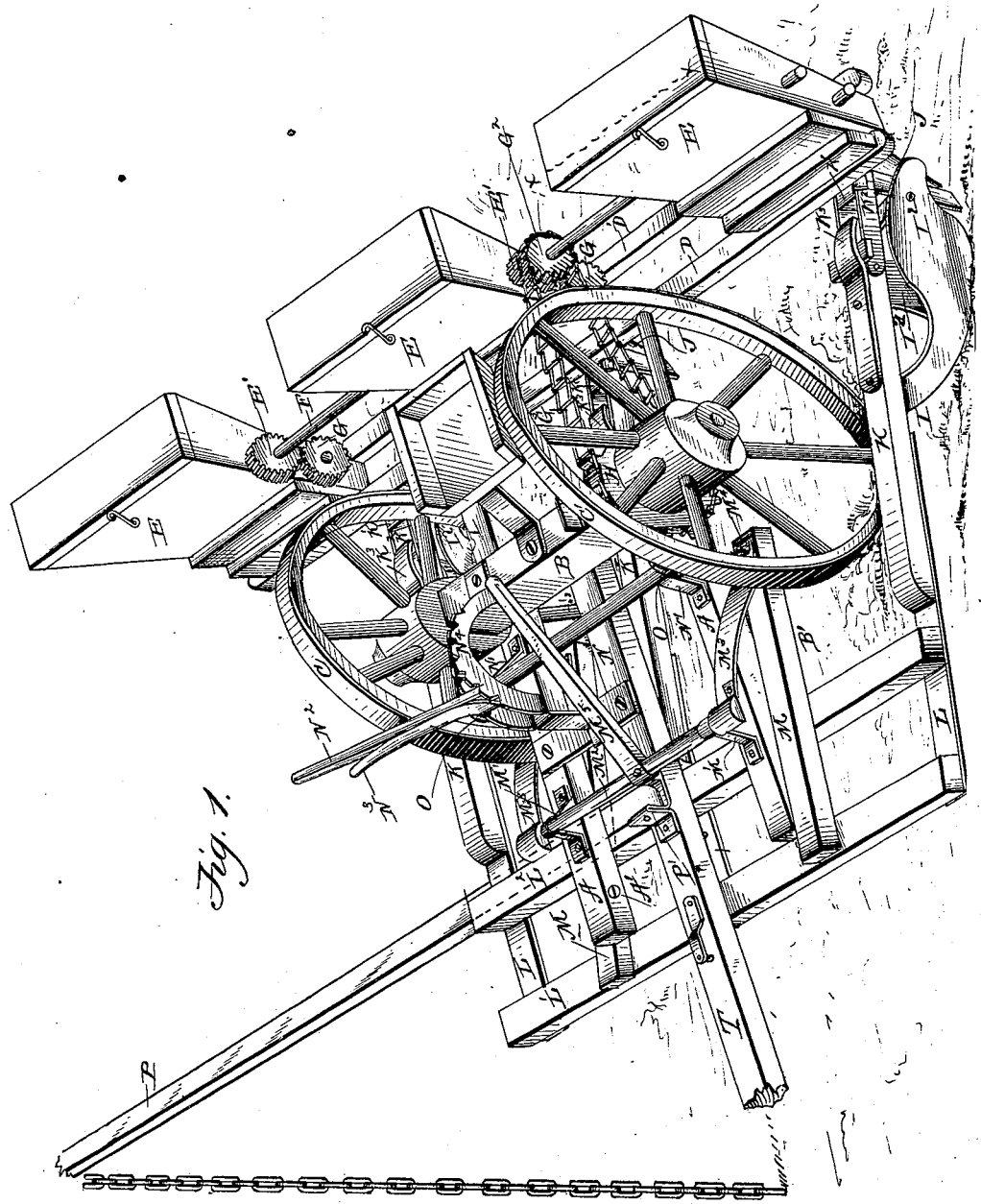
Figure 2:
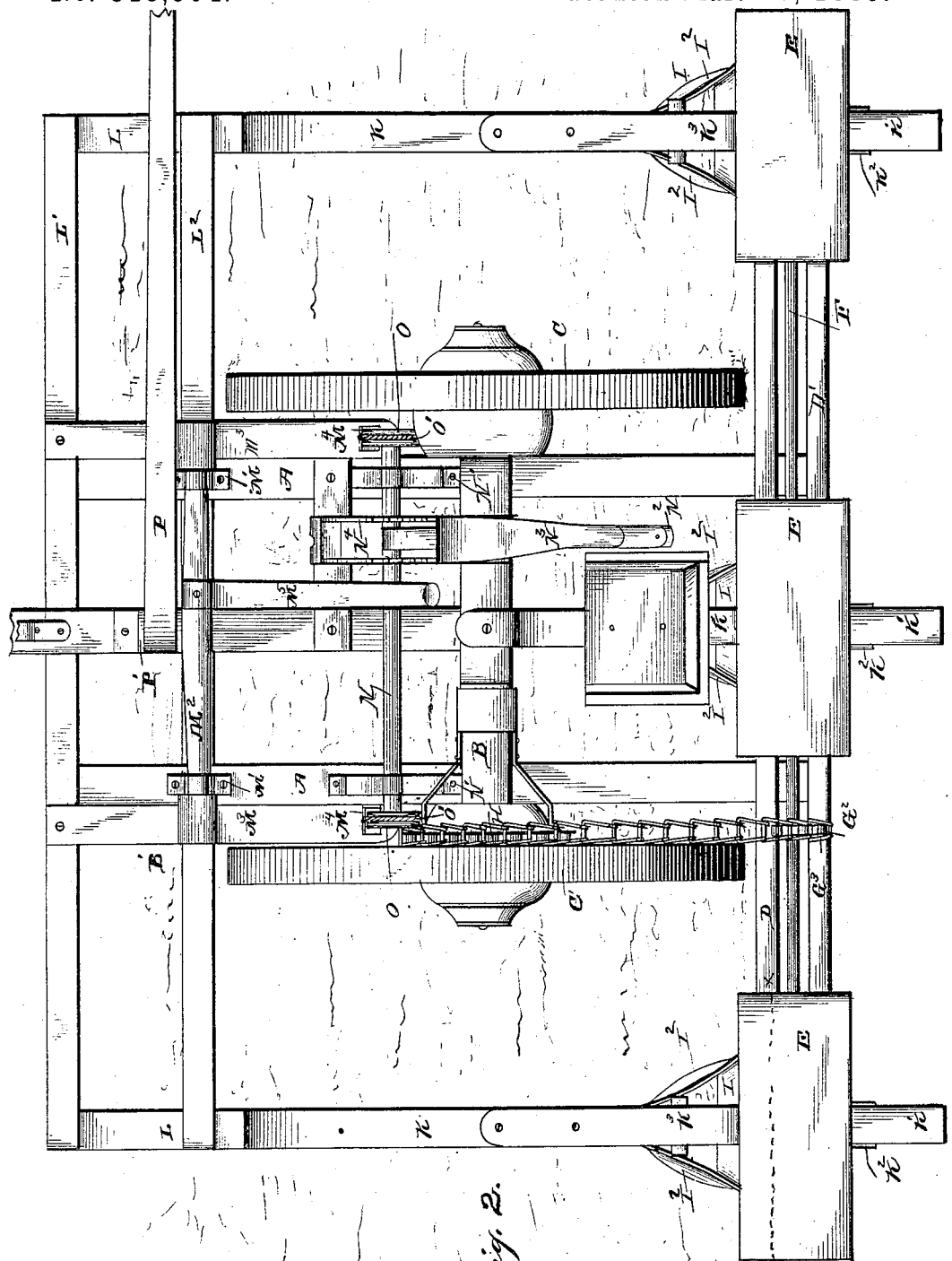

Figure 1 is a view in perspective of a machine embodying my improvements; Fig. 2, a plan view. Fig. 3 is a vertical section on the line $x\,x$ in Fig. 2. Fig. 4 is a rear elevation.

Referring by letter to the accompanying drawings, A designates the main frame of the machine, which is rigidly secured to the axle B, supported on the wheels C C', the latter being the drive-wheel of the machine. Two parallel transverse bars, D D', at the rear of the frame support the hoppers E, three in number, from which the fertilizer is dropped. A shaft, F, common to all three of the hoppers E, is provided with a pinion, E', for each hopper E, and these pinions E' engage pinions G on the ends of the shafts of the fluted feed-rollers G' in the hoppers. The shaft F is provided with a sprocket-wheel, $G^2$, and a sprocket-chain, $G^3$, running over this sprocket-wheel $G^2$, runs over a sprocket-wheel, H, on the drive-wheel C', and drives the shaft F, and feeds the fertilizer to the furrow in rear of the plows I, which open the furrows. The hoppers E are provided in their discharge-opening with vibrating serrated droppers I', which are operated by the toothed rollers and vibrated, and thereby caused to drop the fertilizer in the furrow. In the rear of the opening-plows there are the distributers J, which follow the plows and scatter or spread the fertilizer and mix it with the soil. These plows are attached to beams K K K, which are connected by spring-straps L to two parallel transverse bars, L' $L^2$, secured to the longitudinal bars M M of the auxiliary frame.

Near their forward ends the side bars of the main and auxiliary frames are pivoted together. Bearings M' rise from the side bars of the main frame, and in these bearings M' a rock-shaft, $M^2$, has its bearings. The ends of rock-shaft $M^2$ are connected by flat springs $M^3$ $M^3$ with eyebolts $M^4$, passed through holes in the ends of the springs into one of a series of holes in the side rails of the auxiliary frame. A rock-shaft, N, rests in bearings N', rising from the main frame near the axle, and said rock-shaft N is provided with a lever, $N^2$, having a spring-detent, $N^3$, which engages the notches of an arched rack, $N^4$. At each end of the rock-shaft N is provided a grooved pulley, O, and these pulleys O are connected by chains or ropes O' to the eyebolts $M^4$ of the auxiliary frame. The lever $N^2$ is employed to apply pressure to the plows to cause them to run deep.

A marker consisting of an arm, P, pivoted in bearings P', secured to the tongue of the machine, and provided at its outer end with a chain, is used in connection with this machine to mark off the land, and can be turned from side to side. The rock-shaft $M^2$ is controlled by a foot-lever, $M^5$, which extends to within convenient reach of the driver's seat. The hand-lever $N^2$, for operating the rock-shaft N, extends back along the side of the driver's seat. The auxiliary frame is bolted to the main frame, as shown at A', in order that the plows may be raised out of the ground when necessary. The plow-beams K K K are made in sections K K', so that the stirrers or mixers in rear of the plows may pass over stones and stumps should they be in the way of the mixers or distributers J. The sections K' of the beams are pivoted by strap-connections $K^2$ to the sides of the plow-beams K, and flat metal springs $K^3$ are secured upon the longer sections K of the beams and project beyond the rear ends of the sections K and part way over the strap-connections $K^2$. Break-pins $K^6$ are inserted between the springs $K^3$ and the sections $K^2$ of the plow-beams K, so that when the mixers meet with an obstruction the break-pins will yield and break before the mixers will be broken, and the mixers will move up and pass over the obstruction. The opening-plows are provided with cuttingshares, which extend forwardly from the wings I², curve upwardly, and are connected to the plow-beams at their upper ends. This construction renders the plows I self-clearing. The rear end of the tongue T is connected to the axle, and the front cross-bar of the auxiliary frame is hinged to the tongue, and provision is thereby made for adjusting said auxiliary frame with which the plows are connected.

Having thus fully described my invention, what I claim as new, and desire to secure by Letters Patent of the United States, is—

1. The combination, with the main frame and the pivoted auxiliary frame carrying the plows and distributers, of the rock-shaft provided with a foot-lever and the springs connecting the ends of said rock-shaft to the rear ends of the intermediate rails of the auxiliary frame, substantially as specified.

2. The combination, with the main frame and the pivoted auxiliary frame, as described, of the plows connected by spring-connections to the parallel bars of the auxiliary frame, and the levers, spring-pawl and ratchet, and rock-shafts, substantially as specified.

3. The combination, with the sectional plow-beam K, having the spring K³, secured thereto and projecting over the rear end of said section K, of the section K′, pivoted to the rear end of the section K by the metal straps K², and the break-pin interposed between the section K, the spring K³, and the strap-connections K², substantially as specified.

4. The combination, with the hoppers provided with the vibrating serrated droppers I′ in their discharge-openings, of the fluted or grooved feed-rollers G′, and the toothed rollers for actuating the droppers, as set forth.

5. The combination, with the main frame, the axle, driving-wheels, and the transverse bars D D′, carrying the hoppers, and arranged in rear of the wheels, of the auxiliary frame pivoted to the main frame, and arranged outside of the wheels, and carrying the plows and distributers on each side of said wheels, the shaft F, for operating the seeding devices, and gearing connecting the driving-wheel with said shaft, as and for the purpose set forth.

In testimony that I claim the foregoing as my own I have hereto affixed my signature in presence of two witnesses.

WILLIAM AUGUSTUS LAWRENCE.

Witnesses:
LUKE HOMURTON,
JOHN W. RICKEY.